3,300,992
HIGH VACUUM PUMPING WITH IMPREGNATED ADSORBENTS
Donald G. Hager and Milton Manes, Pittsburgh, Pa., assignors to Pittsburgh Activated Carbon Company, Pittsburgh, Pa., a corporation of Pennsylvania
No Drawing. Filed Nov. 3, 1964, Ser. No. 408,669
7 Claims. (Cl. 62—48)

This invention relates to the development of high vacuum at low temperature.

At liquid nitrogen temperatures nitrogen is readily absorbed by activated carbon but hydrogen is not. Consequently, it is difficult to obtain a high vacuum under these conditions in a system containing hydrogen. The presence of a metal vessel complicates the problem since metals, e.g., iron and steel, normally contain a small amount of entrapped hydrogen which is desorbed during the evacuation process.

In one specific example a metal (steel) vessel intended to be evacuated to a high vacuum was pre-evacuated by pumping to about 0.1 mm. after which it was exposed to a plate containing activated carbon at $-195°$ C. The pressure was reduced to several microns (1 micron=$10^{-3}$ torr). A similar reduction in pressure was achieved in the same vessel without using any carbon. The reason for this is that the atmosphere consisted of water vapor and hydrogen. The former was readily condensible by the low temperature but the latter was not condensible at all since the carbon would not adsorb it at the temperature employed.

Accordingly, it is an object of the invention to reduce the pressure of a vacuum system containing nitrogen and hydrogen by adsorption on a refrigerated adsorbent.

Another object is evacuate metal systems, e.g., large storage flasks for cryogenic liquids and space chambers.

A further object is to attain vacuums of $10^{-5}$ torr and higher.

A further object is to develop a simple system of vacuum pumping equal to or superior to diffusion pumps while avoiding the relatively large expenses attendant upon the purchase of diffusion pumps and their use over long periods of degassings.

Yet another object is to avoid the problems of degassing gettering material at elevated temperatures.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by cryosorption pumping at liquid nitrogen temperatures, e.g., $-190°$ C. employing activated carbon impregnated with a chemisorptive or gettering material for hydrogen. Thus the activated carbon can be impregnated with iron oxide, e.g., $Fe_2O_3$, $Fe_3O_4$ and FeO, NiO, $Co_2O_3$, $Co_3O_4$, ZnO, $Ag_2O$, CdO, HgO, copperoxide, e.g., cupric oxide and cuprous oxide, or tungsten, cobalt, palladium, rhodium or platinum.

Simply by placing refrigerated carbon impregnated with the chemisorbent in the system it is possible in cryogenic pumping to get vacuums of $10^{-5}$ torr or below, e.g. $10^{-7}$ torr, $10^{-9}$ torr and even up to $10^{-10}$ torr.

*Example 1*

In a specific example a metal (steel) vessel to be evacuated to a high vacuum was pre-evacuated to about 0.1 mm., after which it was exposed to activated carbon impregnated with ferric and cupric oxides, at a temperature of $-195°$ C. and cryosorption pumping was continued to remove nitrogen, hydrogen and traces of other materials still present. The pressure was reduced to $10^{-9}$ torr.

In a similar example in which unimpregnated activated carbon was employed it was not possible to reduce the pressure below $2 \times 10^{-3}$ torr.

The impregnation of the activated carbon with the chemisorbing agent results in a much larger surface area for the chemisorbent than is true in the normal case where it is not impregnated on active carbon.

The success of the present invention is apparently based at least in part on the hitherto unrecognized fact that at liquid nitrogen temperature it is necessary to employ separate but simultaneous means to remove both nitrogen and hydrogen. The nitrogen is removed physically by the activated carbon itself whereas the hydrogen is removed chemically by the chemisorber impregnated on the activated carbon.

The iron and copper oxides impregnated activated carbon in Example 1 was prepared by first impregnating the activated carbon with aqueous ferric chloride solution, then aqueous ammonium hydroxide followed by evaporating to dryness, then adding cupric ammonium carbonate solution and then again evaporating to dryness and heating to decompose the cupric carbonate to the oxide. In Example 1 the impregnated carbon contains cupric oxide equivalent to 5.1% copper and ferric oxide oxide equivalent to 2.2% iron (the percentages are weight percentages based on the amount of activated carbon). The amount of copper and iron oxides is not critical. Thus they can be used in an amount equivalent to 1–10% of the free metal based on the weight of the activated carbon.

*Example 2*

In a second example the activated carbon was impregnated with tungsten powder rather than iron and copper oxides. Cryogenic pumping at the temperature of liquid nitrogen using the present procedure is a much simpler and more economical system than the use of diffusion pumps and gives equal or superior results. The present procedure is widely applicable in the fabrication of vacuum vessels and in the evacuation of metal systems in general.

The activated carbon containing container can be kept cold by external cooling with liquid nitrogen.

It is important that the process be carried out at relatively low temperatures, e.g., $-190°$ C. to $-198°$ C. (75 to 83° K.) and in any event not over $-173°$ C. (100° K.) since at higher temperatures, e.g., those employed in Berg Patent 2,632,528 the hydrogen and nitrogen are desorbed.

While the present invention can be used to reduce the pressure to $10^{-1}$ torr it is not usually employed unless a pressure as low as $10^{-3}$ torr or lower, e.g., $10^{-5}$ torr, is desired.

What is claimed is:
1. In a process of cryogenic pumping to obtain high vacuum by removing hydrogen the improvement comprising sorption pumping the hydrogen on activated carbon impregnated with a chemisorber for hydrogen in the system.
2. A process of cryogenic pumping in a system including a vessel containing hydrogen to obtain a high vacuum comprising carrying out the cryogenic pumping of the hydrogen at liquid nitrogen temperature in the presence of activated carbon impregnated with a chemisorber for hydrogen to absorb the hydrogen until the pressure is not over $10^{-5}$ torr.

3. A process according to claim 2 wherein the vessel is a metal vessel.

4. A process according to claim 3 wherein the chemisorber is a metal oxide.

5. A process according to claim 3 wherein the chemisorber is a metal.

6. A process according to claim 3 wherein the cryogenic pumping is carried out to a pressure of not over $10^{-7}$ torr.

7. A process according to claim 3 wherein the vessel is a metal vessel and the metal vessel is pre-evacuated to 0.1 mm. and is then further evacuated by cryogenic pumping at $-195°$ C. in a system containing activated carbon impregnated with a mixture of iron and copper oxides until the pressure is reduced below $10^{-7}$ torr.

References Cited by the Examiner

UNITED STATES PATENTS

| | | | |
|---|---|---|---|
| 1,519,470 | 12/1924 | Wilson | 252—447 |
| 2,358,359 | 9/1944 | Stuart | 252—421 |
| 2,511,290 | 6/1950 | Morrell | 252—447 |
| 2,632,528 | 3/1953 | Berg | 55—61 |
| 2,712,730 | 7/1955 | Spangler | 62—48 |
| 2,770,932 | 11/1956 | Polye | 53—6 |
| 2,963,441 | 12/1960 | Dolian | 252—190 |
| 3,009,629 | 11/1961 | Garin et al. | 62—555 |
| 3,108,621 | 10/1963 | Harries | 141—8 |
| 3,116,764 | 1/1964 | Jepsen | 141—8 |

LLOYD L. KING, *Primary Examiner.*